(12) United States Patent
Kim

(10) Patent No.: US 10,351,082 B2
(45) Date of Patent: Jul. 16, 2019

(54) METAL GROMMET

(71) Applicant: Hong Kwan Kim, Seoul (KR)

(72) Inventor: Hong Kwan Kim, Seoul (KR)

( * ) Notice: Subject to any disclaimer, the term of this patent is extended or adjusted under 35 U.S.C. 154(b) by 0 days.

(21) Appl. No.: 15/361,768

(22) Filed: Nov. 28, 2016

(65) Prior Publication Data

US 2017/0234362 A1 Aug. 17, 2017

(30) Foreign Application Priority Data

Feb. 16, 2016 (KR) .......................... 10-2016-0017912
Apr. 7, 2016 (KR) .......................... 10-2016-0042978

(51) Int. Cl.
*A44B 13/00* (2006.01)
*B60R 16/02* (2006.01)

(52) U.S. Cl.
CPC ...... *B60R 16/0222* (2013.01); *A44B 13/0088* (2013.01); *A44B 13/0064* (2013.01)

(58) Field of Classification Search
CPC ............. B60R 16/0215; B60R 16/0222; F16B 5/0258; F16L 5/10; H01B 17/58; H02G 3/083
USPC ............................................. 16/2.1; 24/713.7
See application file for complete search history.

(56) References Cited

U.S. PATENT DOCUMENTS

| 5,779 | A | * | 9/1848 | Penfield | ............. | H01R 43/0484 |
| | | | | | | 16/2.1 |
| 84,900 | A | * | 12/1868 | Norcross | ................ | B63H 9/08 |
| | | | | | | 114/114 |
| 382,921 | A | * | 5/1888 | Wilcox | ..................... | B63H 9/08 |
| | | | | | | 114/114 |
| 382,922 | A | * | 5/1888 | Wilcox | ..................... | B63H 9/08 |
| | | | | | | 114/114 |
| 382,923 | A | * | 5/1888 | Wilcox | ..................... | B63H 9/08 |
| | | | | | | 114/114 |
| 1,334,163 | A | * | 3/1920 | Neuberth | ................. | A43C 5/00 |
| | | | | | | 16/2.1 |
| 1,527,023 | A | * | 2/1925 | Bowden | ................... | G10K 1/08 |
| | | | | | | 16/2.1 |
| 2,143,087 | A | * | 1/1939 | Rau | ......................... | A43C 5/00 |
| | | | | | | 24/326 |

(Continued)

FOREIGN PATENT DOCUMENTS

KR 10-1229936 B1 2/2013
KR 10-1556864 B1 10/2015

(Continued)

*Primary Examiner* — Jeffrey O'Brien
(74) *Attorney, Agent, or Firm* — STIP Law Group, LLC

(57) ABSTRACT

A metal grommet includes a front body and a back body which are brought into contact with an object. The front body includes a flange provided with a plurality of fixing bosses, a cylindrical front barrel vertically protruding from the flange, a plurality of outer coupling teeth formed on a front end of the front barrel, and a plurality of rib grooves formed between the outer coupling teeth at regular intervals. The back body includes a flange provided with a plurality of fixing bosses, a cylindrical back barrel vertically protruding from the flange, the back barrel being inserted into the front barrel, and an inner coupling flare protruding from the flange and spaced apart from the back barrel, in which the inner coupling flare is formed by casting, and is pressed by a presser so that a front end of the inner coupling flare is bent inwardly.

2 Claims, 10 Drawing Sheets

(56) References Cited

U.S. PATENT DOCUMENTS

| | | | | |
|---|---|---|---|---|
| 2,901,800 | A * | 9/1959 | Koehl | F16B 19/10 |
| | | | | 16/2.1 |
| 3,264,677 | A * | 8/1966 | Olson | H02G 3/0616 |
| | | | | 16/2.1 |
| 3,399,435 | A * | 9/1968 | Ackerman, Jr. | A43C 5/00 |
| | | | | 16/2.1 |
| 3,512,224 | A * | 5/1970 | Newton | A43C 5/00 |
| | | | | 24/713.7 |
| 3,979,798 | A * | 9/1976 | Meyer | A43C 5/00 |
| | | | | 16/2.1 |
| 4,372,013 | A * | 2/1983 | Gautier, Jr. | A43C 5/00 |
| | | | | 16/2.1 |
| 4,890,362 | A * | 1/1990 | Odajima | A43C 5/00 |
| | | | | 24/713.7 |
| 6,557,208 | B2 * | 5/2003 | Huet | B62D 25/24 |
| | | | | 16/2.1 |
| 9,003,618 | B2 * | 4/2015 | Violato | A41F 1/02 |
| | | | | 24/713.7 |

FOREIGN PATENT DOCUMENTS

| | | | |
|---|---|---|---|
| KR | 10-1574461 | B1 | 12/2015 |
| KR | 10-1583359 | B1 | 1/2016 |

\* cited by examiner

METAL GROMMET

CROSS REFERENCE TO RELATED APPLICATIONS

The present application claims the benefit of Korean Patent Application Nos. 10-2016-0017912 and 10-2016-0042978, filed in the Korean Intellectual Property Office on Feb. 16, 2016 and Apr. 7, 2016, respectively, the entire contents of which are incorporated herein by reference.

BACKGROUND OF THE INVENTION

1. Field of the Invention

The present invention relates to a metal grommet which can be firmly engaged to an object by use of a simple coupler formed on the grommet which is made by casting.

2. Description of Related Art

A grommet, such as an eyelet, is inserted into an opening formed in a sheet of textile fabric, accessories, or the like, and consists of a front body and a back body, which are made of metal, such as aluminum, by casting and are coupled to each other. After a front body 1 and a back body 2 are positioned on opposite sides of an object 3, as illustrated in FIGS. 1 and 2, the grommet is formed by fixing the bodies with screws 4.

The front body and the back body which are inserted into the object are usually made of a metal, such as aluminum, steel, or copper, or a plated metal to show various designs and realize a high quality. Therefore, the metal grommet has some drawbacks in that a shape of the coupler is limited and the bodies easily slip, as compared with eyelets made of synthetic resin through injection.

Since the metal grommet is made by casting, a rib is formed only in a straight shape, and thus it is difficult to make a coupler for coupling the front body and the back body.

In addition, the metal grommet which is made by the casting has another problems in that it is not easy to form the strong coupler, and the bodies are easily decoupled or slipped after coupling, in view of fabrication features of the casting and physical properties of the metal.

SUMMARY OF THE INVENTION

Therefore, an object of the present invention is to provide a metal grommet made by casting which can be firmly coupled to an object, in order to improve a decoration effect and aesthetic appreciation and to prevent tearing or abrasion of the objection, as well as solving the above-described problems in that the grommet is complicatedly engaged to the object by screws, the grommet is easily detached from the object, and the grommet is slid on the object.

In order to achieve the above object, there is provided a metal grommet including a front body and a back body which are made by casting, penetrate an opening of an object and are coupled to each other, with the object being interposed between the bodies, so that the grommet is firmly engaged to the object. The front body includes a flange provided with a plurality of fixing bosses, and a cylindrical front barrel vertically protruding from the flange and having a through-hole at a center thereof. The back body includes a flange provided with a plurality of fixing bosses, and a cylindrical back barrel vertically protruding from the flange and having a through-hole at a center thereof, the back barrel being inserted into the front barrel. The front body further includes a plurality of outer coupling teeth formed on a front end of the front barrel, and a plurality of rib grooves formed between the outer coupling teeth at regular intervals. The back body further includes an inner coupling flare protruding from the flange and spaced apart from the back barrel, in which the inner coupling flare is formed by casting, and is pressed by a presser so that a front end of the inner coupling flare is bent inwardly. When the front body and the back body are mounted to the object, the outer coupling teeth formed on the front barrel are coupled to the inner coupling flare in a hook type while the outer coupling teeth are outwardly widened by a guide surface of the back barrel. Since the inner coupling flare formed on the back body is inserted into the outer coupling teeth formed on the front body in the hook type, the front body is not detached from the back body after fastening.

In order to easily widen the outer coupling teeth in an outer direction, a plurality of rib grooves are formed between the outer coupling teeth at regular intervals, when the back body is mounted into the front body, the outer coupling teeth are coupled to the inner coupling flare in the hook type while the outer coupling teeth are outwardly widened by the guide surface of the back barrel, so that the front body is not detached from the back body after fastening.

DETAILED DESCRIPTION OF THE PREFERRED EMBODIMENT

Figure 1:
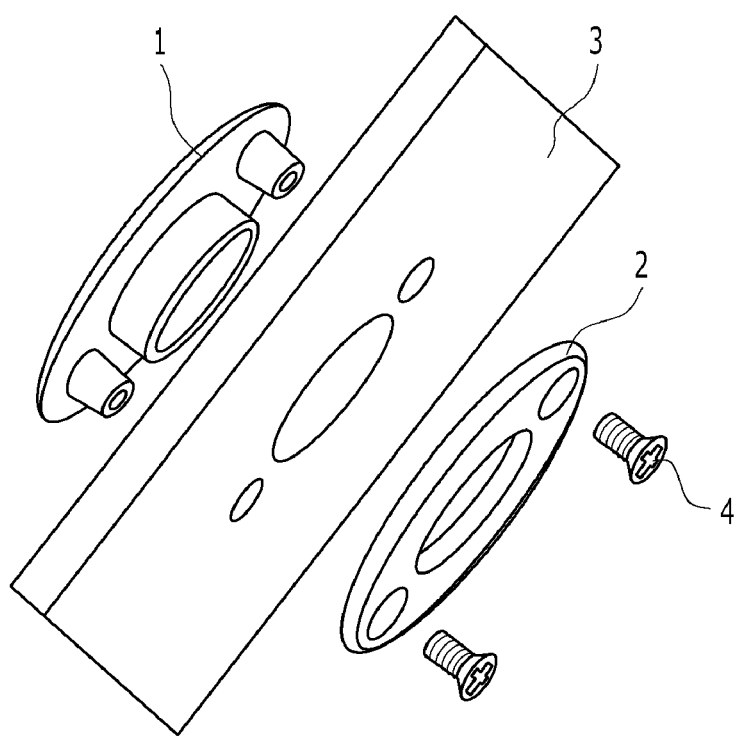
FIG. 1 is an exploded perspective view illustrating a mounting state of a grommet of the related art.
Figure 2:
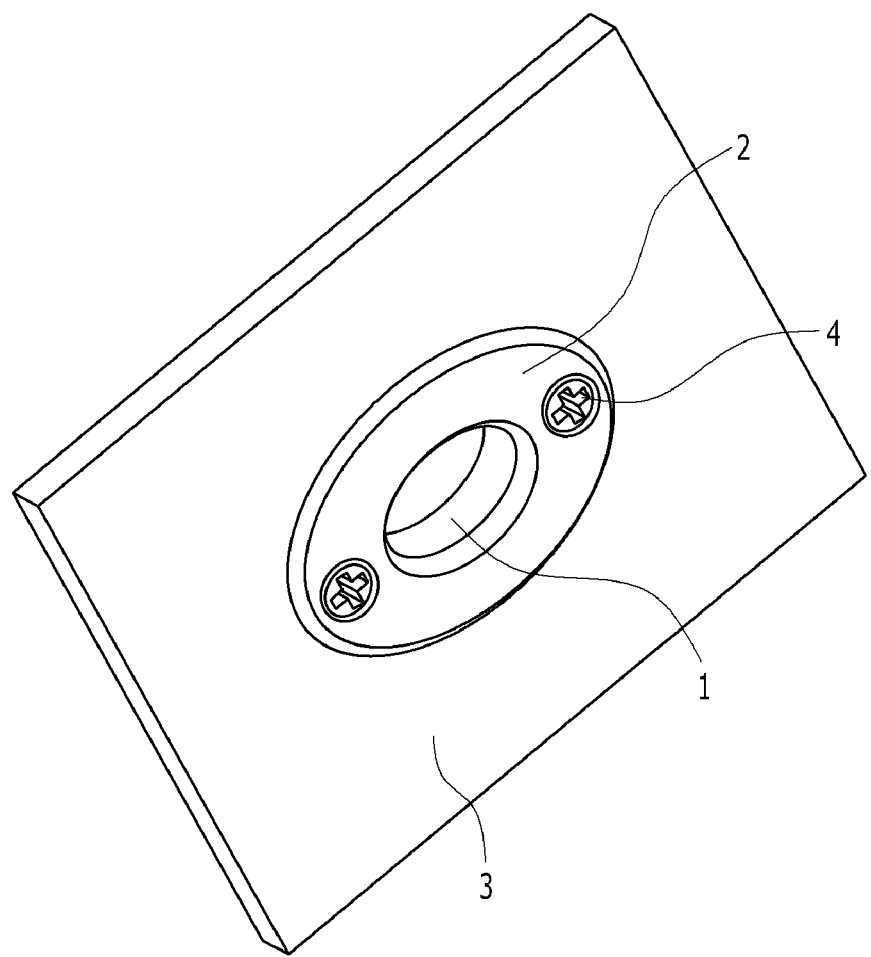
FIG. 2 is a perspective view illustrating the mounting state of the grommet of the related art when seen from a bottom.
Figure 3:
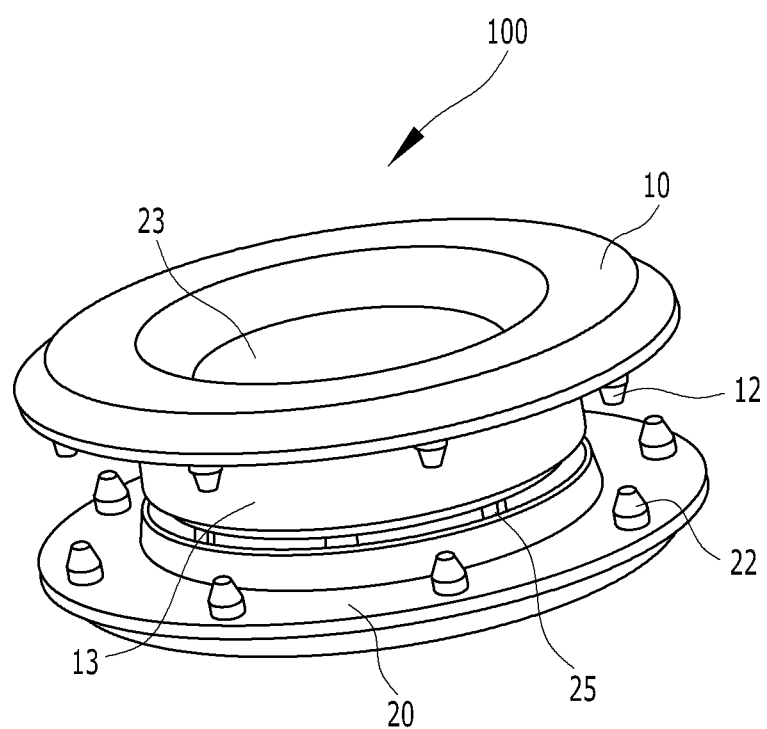
FIG. 3 is a perspective view illustrating a fastening state of a metal grommet according to one embodiment of the present invention.
Figure 4:
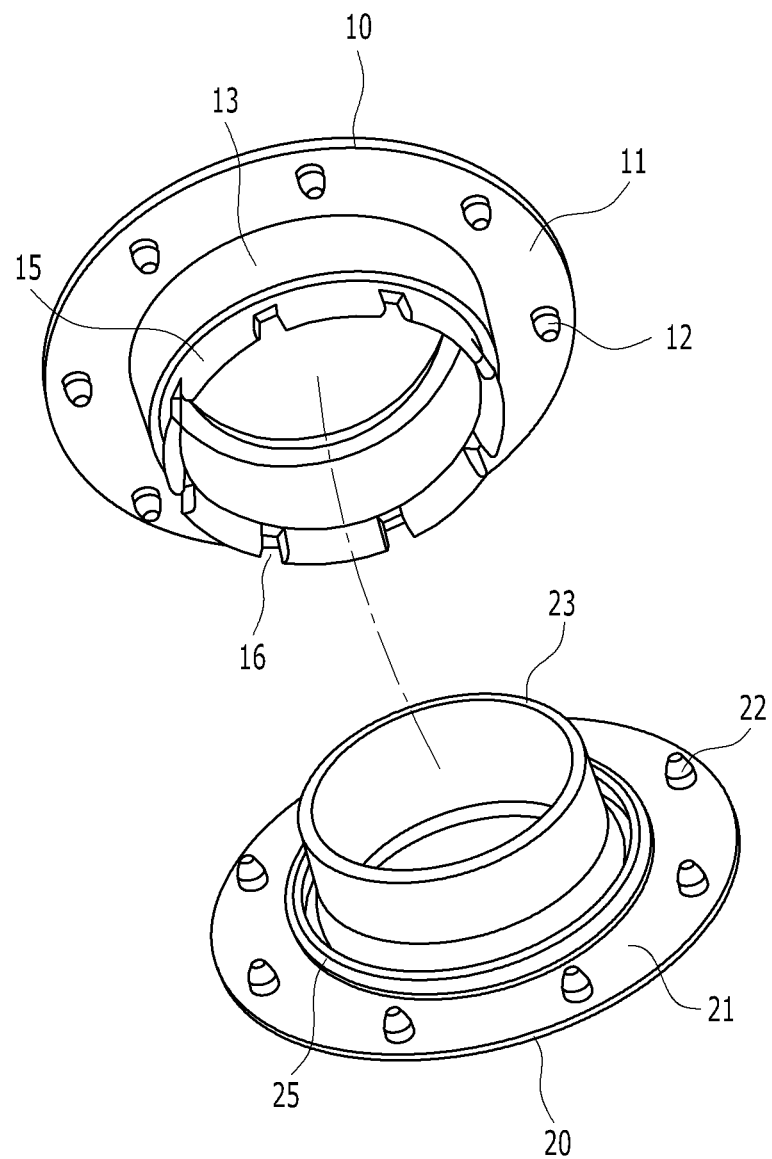
FIG. 4 is an exploded perspective view illustrating the metal grommet according to the embodiment of the present invention.
Figure 5:
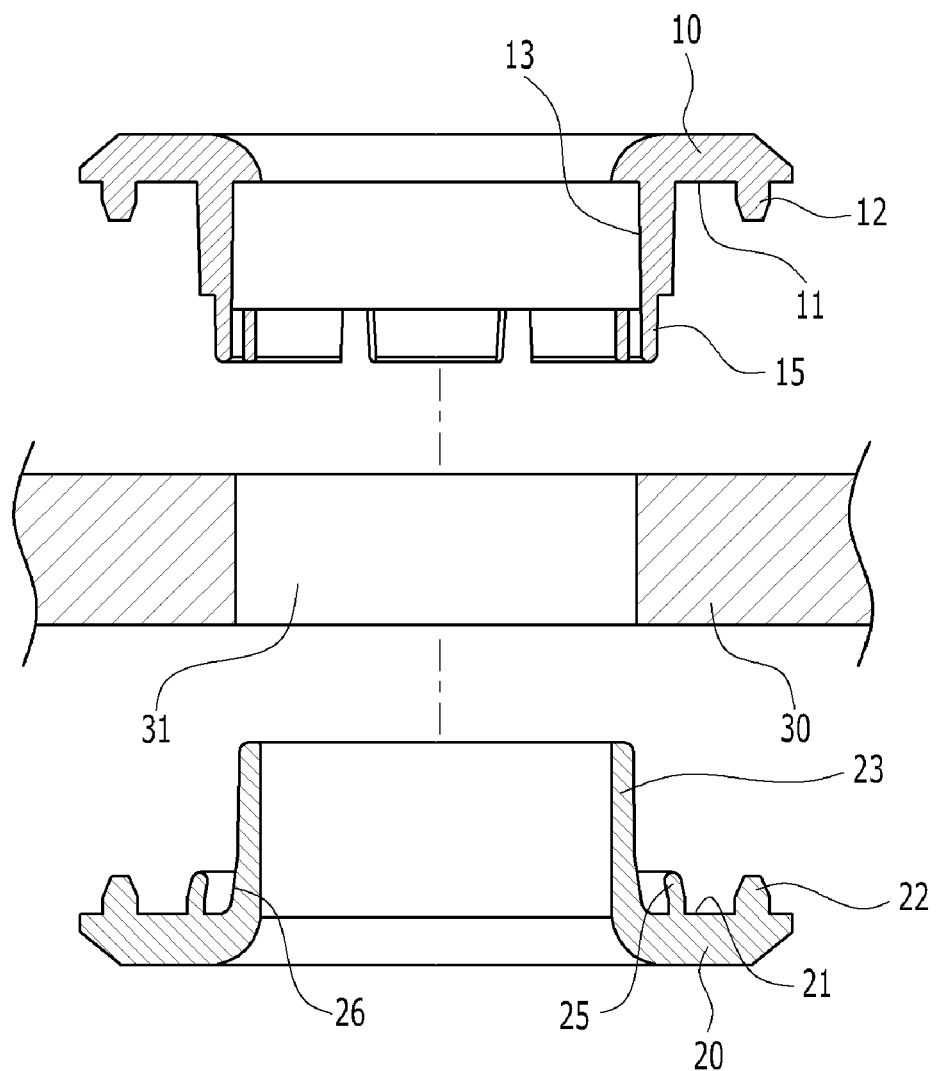
FIG. 5 is a cross-sectional view illustrating a disassembled state of the metal grommet according to the embodiment of the present invention.
Figure 6:
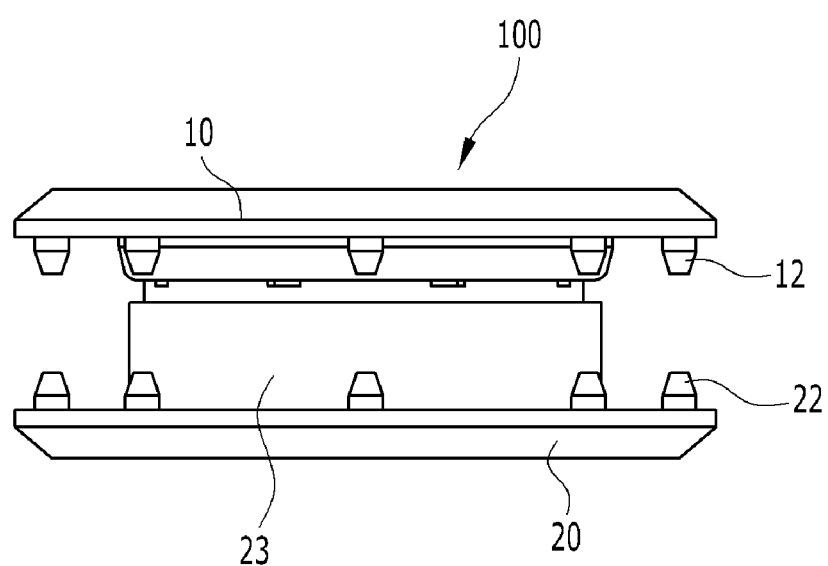
FIG. 6 is a side view illustrating an assembled state of the metal grommet according to the embodiment of the present invention.

Now, a preferred embodiment of the present invention will be described in detail with reference to the accompanying drawings.

The present invention can firmly fix a metal grommet, which is made by casting, to an opening of an object for an improved decoration effect and aesthetic appreciation, of which a front body is provided with an outer coupling teeth, and a back body is provided with an inner coupling flare, so that the bodies are coupled to each other through a simple coupling process.

The present invention relates to the metal grommet which is inserted and mounted to the opening of the object, wherein the front body includes a flange provided with a plurality of fixing bosses, and a cylindrical front barrel vertically protruding from the flange and having a through-hole at a center thereof; and the back body includes a flange provided with a plurality of fixing bosses, and a cylindrical back barrel vertically protruding from the flange and having a through-hole at a center thereof. After the front body and the back body are made by casting, the inner coupling flare of the back barrel is pressed to be inwardly bent, and then the inner coupling flare is interference-fitted into the outer coupling teeth. Therefore, when the front body and the back body are mounted to the object, the outer coupling teeth are coupled to the inner coupling flare in a hook type while the outer coupling teeth are outwardly widened by the guide surface of the back barrel, thereby achieving the strong engagement by simple work.

Since a common metal grommet is made of a metal by casting for the purpose of a nice design, formation of a straight rib is easy, and thus it is considerably difficult to couple the front body and the back body by other methods than a screw. According to the present invention, after the inner coupling flare is formed on the back body, a front end of the inner coupling flare is inwardly bent by pressing. Therefore, when the back body is mounted into the front body, the outer coupling teeth are coupled to the inner coupling flare in the hook type while the outer coupling teeth are outwardly widened by the guide surface of the back barrel. As a result, the engagement between the outer coupling teeth and the inner coupling flare is not released unless strong force is not applied, thereby allowing the front body and the back body to maintain the firmly engaging state.

The outer coupling teeth are vertically formed on the front end of the front barrel when the front body is made by the casting, and a plurality of rib grooves are formed between the outer coupling teeth at regular intervals. When the outer coupling teeth are moved along the guide surface of the back barrel, the outer coupling teeth are outwardly and easily widened. The inner coupling flare protrudes separately from the back barrel, and is inwardly bent by the pressing work when the back body is made by the casting. If the front body is interference-fitted into the back body in the state in which the inner coupling flare of the back body is inwardly bent, the outer coupling teeth are outwardly widened along the guide surface of the back barrel, thereby achieving the hook engagement between the outer coupling teeth and the inner coupling flare.

A metal grommet 100 of the embodiment includes a front body 10 and a back body 20, and is made by casting, and an inner coupling flare 25 formed on the back body 20 is bent inwardly after casting.

The front body 10 and the back body 20 of the metal grommet according to the embodiment respectively include flanges 11 and 21 which pass through an opening 31 an object 30 and then are brought into contact with an inner peripheral surface of the opening. The flanges 11 and 21 are respectively provided with a cylindrical front barrel 13 and a cylindrical back barrel 23, and the back barrel 23 is inserted into the front barrel 13. Further, the flanges 11 and 21 are respectively provided with fixing bosses 12 and 22 at regular intervals which pinch the object to prevent slip between the object 30 and the grommet 100.

Figure 7:
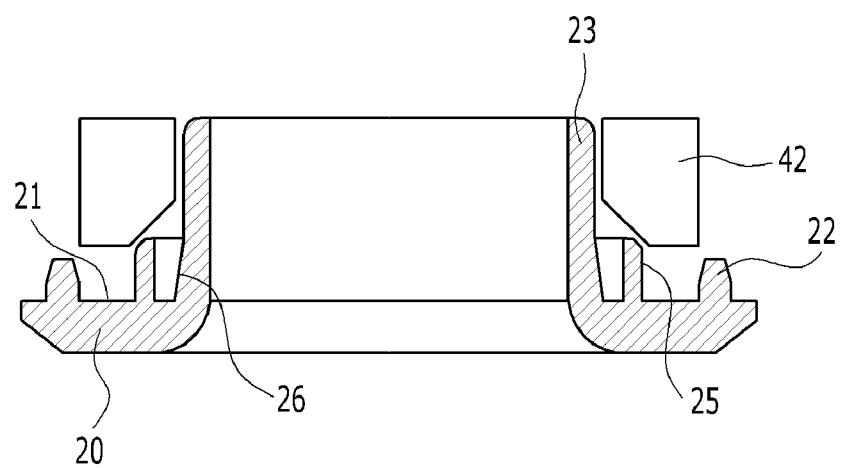
FIG. 7 is a cross-sectional view illustrating an inwardly bent flare of the metal grommet.

The front body 10 of the grommet according to the embodiment has a plurality of outer coupling teeth 15 formed on a front end of the front barrel 13, and a plurality of rib grooves 16 formed between the outer coupling teeth 15 at regular intervals, so that the outer coupling teeth 15 can be easily bent outwardly. The back body 20 of the grommet according to the embodiment has an inner coupling flare 25 protruding from the flange 21 and spaced apart from the back barrel 23. The inner coupling flare is preferably formed by casting. The inner coupling flare 25 is pressed by a presser 42 (see FIG. 7) so that a front end of the inner coupling flare is bent inwardly.

The back barrel 23 is formed with a guide surface 26 so that the front ends of the outer coupling teeth 15 are outwardly widened so as to be coupled to the inner coupling flare 25 in a hook type. When the back barrel 23 is inserted into the front barrel 13, the outer coupling teeth 15 are guided and pressed by the guide surface 26, and thus the outer coupling teeth 15 are outwardly widened. In this instance, since the front ends of the outer coupling teeth 15 are outwardly widened and thus are positioned in the inner coupling flare 25 which is inwardly bent, the outer coupling teeth 15 are engaged with the inner coupling flare 25 in the hook type. After the engagement, the outer coupling teeth 15 are not detached from the inner coupling flare 25.

The back barrel 23 is engaged with the front barrel 13 so that the front end of the back barrel 23 does not protrude into an inner space of the front body 10.

Since the front body 10 and the back body 20 of the metal grommet according to the embodiment are made of the metal by the casting, the inner coupling flare 25 of the back body 20 can be inwardly bent by the presser 42 after the back body 20 is made by the casting. Since the outer coupling teeth 15 formed on the front barrel 13 are formed at regular intervals, the front ends of the outer coupling teeth 15 are guided by the guide surface 26 of the back barrel 23, so that the outer coupling teeth 15 are outwardly widened by the shape of the guide surface 26.

According to the present invention, the inner coupling flare 25 and the outer coupling teeth 15 are formed in a straight shape by the casting, and the inner coupling flare 25 is pressed by the presser 42 so that the front end thereof is bent inwardly. Therefore, when the front body 10 is engaged to the back body 20, the outer coupling teeth 15 are guided by the guide surface 26 of the back barrel 23, so that the front ends of the outer coupling teeth 15 are outwardly widened by the guide surface 26, and thus the outer coupling teeth 15 are engaged to the inner coupling flare 25 in the hook type.

Herein, the front body 10 and the back body 20 are designated depending upon that the body is positioned on the front surface or the rear surface of the object 30. The front body 10 may be disposed on the rear surface, and the back body 20 may be disposed on the front surface. In particular, the configuration of the front body 10 can be exchanged with that of the back body 20.

With the above configuration, the back body 20 is disposed below the opening 31 of the object 30 in the state in which the back barrel 23 can be inserted into the opening 31. The front body 10 is disposed on the object 30 in the state in which the front barrel 13 can receive the back barrel 23. After that, if the back body 10 is placed on a floor, and the front body 10 is pressed downwardly from the top, the outer coupling teeth 15 of the front body 10 are downwardly guided by the guide surface 26 of the back barrel 23, so that the front ends of the outer coupling teeth 15 are outwardly widened. If the outer coupling teeth 15 are outwardly widened, the outer coupling teeth 15 are engaged to the inner coupling flare 25 in the hook type, thereby firmly fixing the front body 10 and the back body 20 to the object 30.

Figure 8:
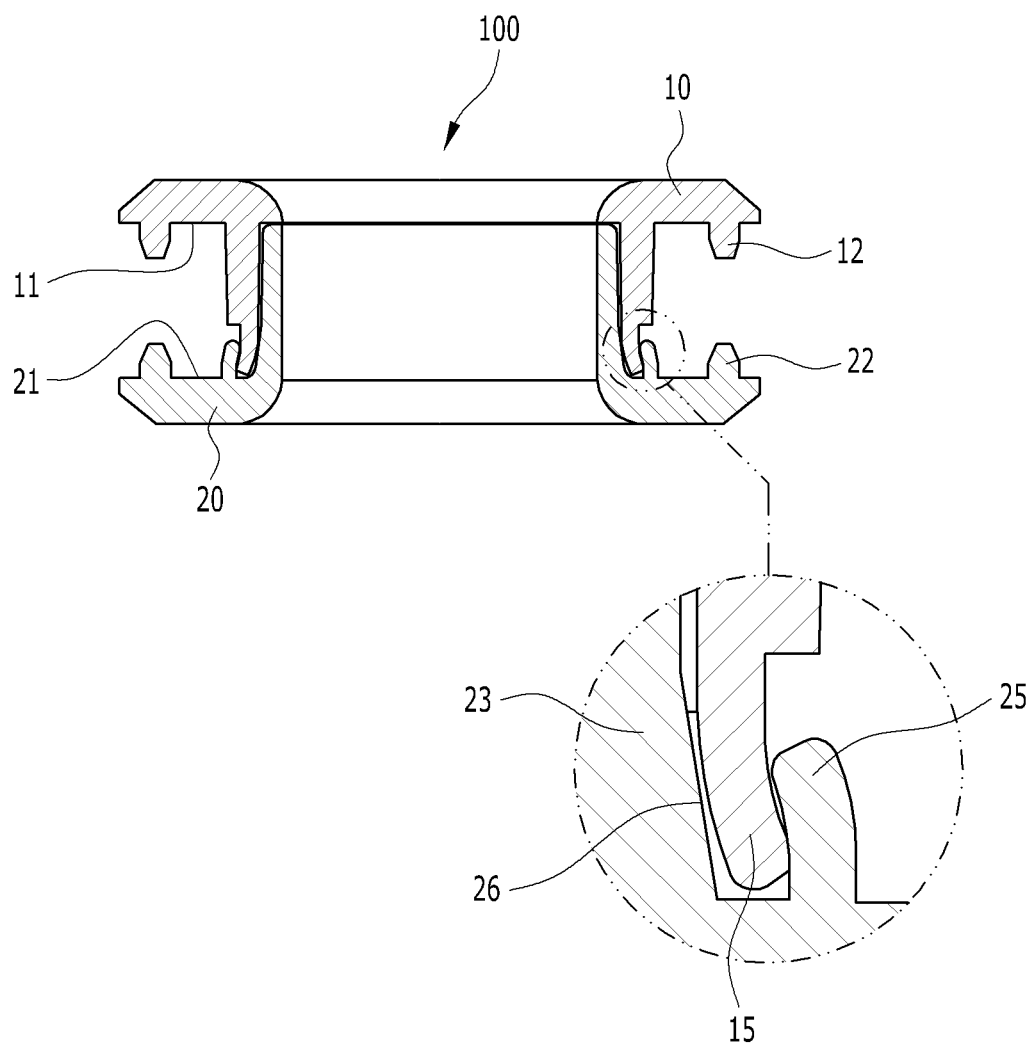
FIG. 8 is a cross-section view illustrating an assembled state of the metal grommet according to the embodiment of the present invention.
Figure 9:
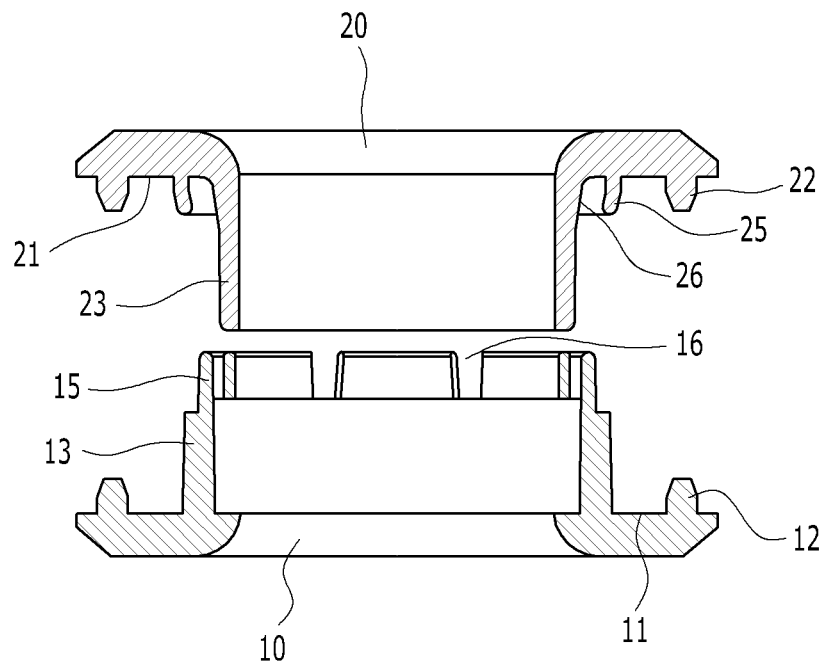
FIG. 9 is a cross-section view illustrating a state of the metal grommet before a front body is coupled to a back body.
Figure 10:
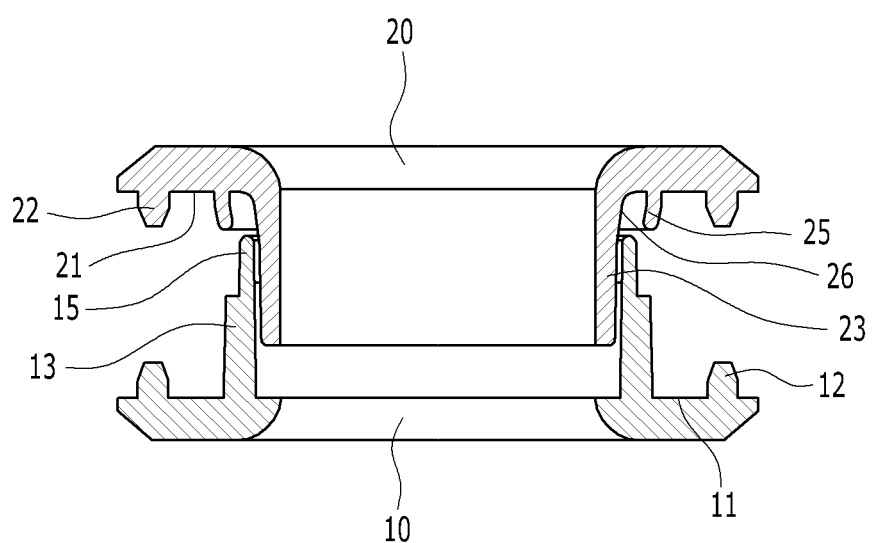
FIG. 10 is a cross-section view illustrating a state of the metal grommet while the front body is coupling to the back body.
Figure 11:
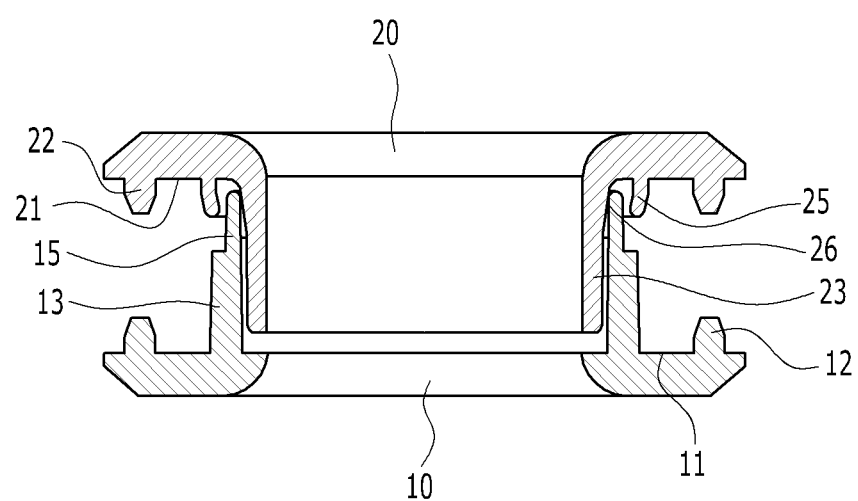
FIG. 11 is a cross-section view illustrating a state of the metal grommet after the front body is coupled to the back body.

In the above process, the flange 11 of the front body 10 and the flange 21 of the back body 20 are brought into close contact with the surface of the object 30, and the fixing bosses 12 and 22 pinch the object 30. Therefore, if the metal grommet 100 is mounted on the object, as illustrated in FIG. 8, the metal grommet can maintain the fixing state, without being slid on the object.

Since the front body 10 and the back body 20 of the grommet according to the embodiment are made of the metal, the bodies can be plated by a noble metal to improve the quality, and can be formed in various designs. After the coupling is completed, the outer coupling teeth 15 are coupled to the inner coupling flare 25 in the hook type, and thus the bodies are not separated from each other.

When the back barrel 23 of the back body 20 is inserted into the front barrel 13 of the front body 10, the back barrel 23 is not away from the flange 11 of the front body 10. Therefore, there is no protruding portion after the front body 10 is coupled to the back body 20.

When the back barrel 23 is compressively inserted into the front barrel 13, the outer coupling teeth 15 formed on the front barrel 13 are outwardly widened by compression while moving along the guide surface 26 of the back barrel 23. In this instance, since the outer coupling teeth 15 are widened to be coupled to the inner coupling flare in the hook type, the outer coupling teeth 15 are firmly hooked to the inner coupling flare 25.

That is, the inner coupling flare 25 of the grommet according to the embodiment is inwardly bent by the presser 42, and the outer coupling teeth 15 are widened while moving along the guide surface 26 when the front body 10 is engaged to the back body 20. Therefore, the outer coupling teeth 15 are smoothly coupled to the inner coupling flare 25 in the hook type, while the outer coupling teeth 15 are outwardly widened by the guide surface 26.

With the configuration described above, since the outer coupling teeth 15 of the front body 10 are coupled to the inner coupling flare 25 in the hook type, the front body can be easily engaged to the back body. The engagement is not only released but also is firmly kept even as time passed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A metal grommet including a front body and a back body which are brought into contact with an object, wherein:
   the front body includes a first flange provided with a plurality of first fixing bosses and a cylindrical front barrel vertically protruding from the first flange,
   the back body includes a second flange provided with a plurality of second fixing bosses and a cylindrical back barrel vertically protruding from the second flange, wherein the cylindrical back barrel being inserted into the cylindrical front barrel,
   wherein the front body further includes a plurality of straight outer coupling teeth formed on a front end of the front barrel, and a plurality of rib grooves fanned between the plurality of straight outer coupling teeth at regular intervals,
   the back body further includes an inner coupling flare protruding from the second flange and spaced apart from the cylindrical back barrel, in which the inner coupling flare is formed by casting, and is pressed by a presser so that a front end of the inner coupling flare is bent inwards,
   a guide surface is formed on an outer peripheral surface of the cylindrical back barrel to have a thickness which is gradually increased towards the back body, and when the front body and the back body are mounted to the object and the back barrel is inserted into the cylindrical front barrel, the outer coupling teeth are brought into contact with the guide surface and inserted into an inside of the inner coupling flare while being, gradually bent outwards, thereby hooking an end of the outer coupling teeth to the front end of the inner coupling flare;
   wherein, when the front body and the back body are mounted to the object, each of the plurality of first fixing bosses is aligned along an axis in the thickness direction of the object with a respective one of the plurality of second fixing bosses.

2. The metal grommet of claim 1, wherein the plurality of second fixing bosses are located directly on the second flange in a circumferential direction such that the inner coupling flare extends between the plurality of second fixing bosses and the cylindrical back barrel.

* * * * *